(12) United States Patent
Weber et al.

(10) Patent No.: US 11,141,612 B2
(45) Date of Patent: Oct. 12, 2021

(54) CHEMICAL PROTECTIVE SHELTER SYSTEM

(71) Applicants: Brian Weber, Robins, IA (US); Karly Groon, Starkville, MS (US); Sherrie Conn, Macon, MS (US); Rhonda Sutton, Louisville, MS (US)

(72) Inventors: Brian Weber, Robins, IA (US); Karly Groon, Starkville, MS (US); Sherrie Conn, Macon, MS (US); Rhonda Sutton, Louisville, MS (US)

(73) Assignee: POLO CUSTOM PRODUCTS, INC., Topeka, KS (US)

( * ) Notice: Subject to any disclaimer, the term of this patent is extended or adjusted under 35 U.S.C. 154(b) by 0 days.

(21) Appl. No.: 16/824,944

(22) Filed: Mar. 20, 2020

(65) Prior Publication Data

US 2020/0360737 A1 Nov. 19, 2020

Related U.S. Application Data

(60) Provisional application No. 62/822,323, filed on Mar. 22, 2019.

(51) Int. Cl.
*E04H 15/14* (2006.01)
*A62B 31/00* (2006.01)
(Continued)

(52) U.S. Cl.
CPC .............. *A62B 31/00* (2013.01); *A62B 13/00* (2013.01); *B01D 46/0028* (2013.01); *B01D 46/0036* (2013.01); *B01D 53/02* (2013.01); *B32B 5/26* (2013.01); *E04H 15/14* (2013.01); *E04H 15/54* (2013.01); *B01D 2253/102* (2013.01);
(Continued)

(58) Field of Classification Search
CPC .................................. E04H 15/10; E04H 15/14
See application file for complete search history.

(56) References Cited

U.S. PATENT DOCUMENTS

| 2,314,830 A | * | 3/1943 | Hunter | G03D 17/00 |
| | | | | 135/93 |
| 3,119,358 A | * | 1/1964 | Colson | E04H 15/56 |
| | | | | 109/1 S |

(Continued)

FOREIGN PATENT DOCUMENTS

CA        1207736        7/1986

*Primary Examiner* — Noah Chandler Hawk
(74) *Attorney, Agent, or Firm* — Christopher A. Proskey; BrownWinick Law Firm

(57) ABSTRACT

A chemical protective shelter system for encapsulating an uncontaminated person or persons is presented. The chemical protective shelter system has a cover assembly extending a length between a top end and a bottom end and having interior surface and an exterior surface and an opening which can be opened and closed repeatedly while still sealing. The chemical protective shelter system includes a layer of a chemical adsorbent material capable of filtering chemical agents while allowing oxygen and carbon dioxide to pass through the material. The chemical protective shelter is specially adapted to house a plurality of people and facilitate a tent like function. The system also includes a port for auxiliary filtered air. The system may also include a powered air purifying respirator which positively pressures the interior space of the system.

30 Claims, 15 Drawing Sheets

(51) Int. Cl.
*E04H 15/54* (2006.01)
*A62B 13/00* (2006.01)
*B01D 46/00* (2006.01)
*B01D 53/02* (2006.01)
*B32B 5/26* (2006.01)
*E04H 15/40* (2006.01)
*E04H 15/42* (2006.01)

(52) U.S. Cl.
CPC .......................... *B01D 2259/4583* (2013.01); *B32B 2260/021* (2013.01); *B32B 2260/04* (2013.01); *B32B 2307/712* (2013.01); *B32B 2607/00* (2013.01); *E04H 15/40* (2013.01); *E04H 15/425* (2013.01)

(56) References Cited

U.S. PATENT DOCUMENTS

| | | | | |
|---|---|---|---|---|
| 4,625,468 A | * | 12/1986 | Hampel | E04H 9/10 109/1 S |
| 5,331,991 A | * | 7/1994 | Nilsson | A62B 13/00 135/93 |
| 5,706,846 A | | 1/1998 | Sutton | |
| 6,076,571 A | | 6/2000 | Burns | |
| 6,119,408 A | * | 9/2000 | Page | E04H 15/22 52/2.23 |
| 6,438,900 B1 | * | 8/2002 | Page | E04H 6/04 52/2.16 |
| 6,461,510 B1 | | 10/2002 | Boles | |
| 6,508,850 B1 | * | 1/2003 | Kotliar | A61G 10/005 55/385.2 |
| 6,715,160 B2 | | 4/2004 | Crye | |
| 7,481,234 B1 | * | 1/2009 | Gustafson | E04H 15/425 135/156 |
| 7,549,431 B1 | * | 6/2009 | Farnworth | A62B 31/00 135/115 |
| 7,722,705 B2 | | 5/2010 | Gadkaree | |
| 10,138,653 B1 | * | 11/2018 | Weber | B32B 5/08 |
| 10,391,737 B2 | | 8/2019 | Calomino | |
| 2002/0083653 A1 | * | 7/2002 | Hilbert | E04H 15/20 52/2.17 |
| 2002/0174888 A1 | | 11/2002 | Brown | |
| 2004/0074529 A1 | * | 4/2004 | Levy | E04H 15/14 135/93 |
| 2010/0299826 A1 | | 12/2010 | Vladimir | |
| 2019/0150628 A1 | * | 5/2019 | Wennerstrom | B01D 53/04 |
| 2020/0063429 A1 | * | 2/2020 | Carter | E04H 15/56 |
| 2020/0102766 A1 | * | 4/2020 | Carter | E04H 15/56 |

* cited by examiner

CHEMICAL PROTECTIVE SHELTER SYSTEM

CROSS REFERENCE TO RELATED APPLICATIONS

This application claims benefit of U.S. Provisional Application No. 62/822,232 which was filed on Mar. 22, 2020, the entirety of which is incorporated herein fully by reference.

FIELD OF THE DISCLOSURE

This disclosure relates to chemical protective systems used in warfare and elsewhere. More specifically, and without limitation, this disclosure relates to a chemical protective shelter system for use in encapsulating uncontaminated and decontaminated individuals.

Overview:

Chemical, biological and nuclear warfare is a growing concern. Chemical warfare involves using the toxic properties of chemicals as weapons. Biological warfare involves using biological agents as weapons. Nuclear warfare involves using the radioactive and/or nuclear materials as weapons. Nuclear, biological and chemical warfare are distinct from conventional warfare in that warfighters on the battle field can become contaminated which presents unique challenges and risks to the warfighters as well as civilians, first responders, medical and humanitarian personnel, and other people involved or present. With proper protective equipment, training, and decontamination measures, the primary effects of chemical, biological and nuclear weapons can be overcome. For purposes of simplicity, chemical weapons and chemical warfare shall be primarily referred to herein. However, it is to be understood that unless specifically stated otherwise, the teachings and disclosure provided herein apply to chemical, biological and nuclear weapons and chemical, biological and nuclear contamination.

Although the use of chemical weapons is prohibited under international humanitarian law, chemical weapons continue to be a threat that armed forces need to be prepared to face. To protect against these threats, warfighters wear protective clothing as well as gas masks that block the chemical agents from reaching and injuring the warfighter.

Protective clothing is effective at preventing the effects of chemical weapons on warfighters. However, if the warfighter is injured, and their protective clothing is punctured or compromised, the warfighter must be treated as well as protected from chemical exposure. However, present solutions do not provide for a manner of effectively shielding an injured or otherwise exposed warfighter wearing the typical Battle Dress Uniform from chemical exposure.

In addition, chemical exposure can occur when there is an industrial accident that releases chemicals into the air. When this happens, people in the affected area often do not have access to protective clothing and masks. Presently there is no adequate solution for shielding multiple people from the effects of chemical weapons or industrial agents.

Therefore, for all the reasons stated above, and all the reasons stated below, there is a need in the art for a chemical protective shelter system for protecting warfighters and innocents alike from contamination, chemical burns, exposure, suffocation, serious injury or death, and other known and unknown chemical hazards.

Thus, it is a primary object of the disclosure to provide a chemical protective shelter system for an individual, or group of individuals, that improves upon the state of the art.

Another object of the disclosure is to provide a chemical protective shelter system for an individual, or group of individuals, that can protect a person from chemical agents.

Yet another object of the disclosure is to provide chemical protective shelter system for an individual, or group of individuals, that allows a person to be housed safely after an injury.

Another object of the disclosure is to provide a chemical protective shelter system for an individual, or group of individuals, that allows those inside the shelter to have visual access to the outside world while being protected from chemical agents.

Yet another object of the disclosure is to provide chemical protective shelter system for an individual, or group of individuals, that allows warfighters, first responders, humanitarians, and others to have visual access to an individual, or group of individuals, on the interior space of the system.

Another object of the disclosure is to provide a chemical protective shelter system for an individual, or group of individuals, that prevents or reduces claustrophobia.

Yet another object of the disclosure is to provide chemical protective shelter system for an individual, or group of individuals, that has a permeable material surface.

Another object of the disclosure is to provide a chemical protective shelter system for an individual, or group of individuals, that can easily open and close.

Yet another object of the disclosure is to provide chemical protective shelter system for an individual, or group of individuals, that has a port or inlet for a powered air purifying respirator and other devices.

Another object of the disclosure is to provide a chemical protective shelter system for an individual, or group of individuals, that can quickly and efficiently close and seal.

Yet another object of the disclosure is to provide chemical protective shelter system for an individual, or group of individuals, that can be quickly erected without the use of tools.

Another object of the disclosure is to provide a chemical protective shelter system for an individual, or group of individuals, that protects from chemical attacks as well as in some cases nuclear and biological attacks.

Yet another object of the disclosure is to provide chemical protective shelter system for an individual, or group of individuals, that can house a plurality of people if necessary.

Another object of the disclosure is to provide a chemical protective shelter system for an individual, or group of individuals, that is robust.

Yet another object of the disclosure is to provide a chemical protective shelter for an individual, or group of individuals, that works effectively.

Another object of the disclosure is to provide a chemical protective shelter system for an individual, or group of individuals, that is durable.

Yet another object of the disclosure is to provide a chemical protective shelter for an individual, or group of individuals, that can be used safely.

Another object of the disclosure is to provide a chemical protective shelter system for an individual, or group of individuals, that can be used in association with people of varying sizes and dimensions.

Yet another object of the disclosure is to provide a chemical protective shelter for an individual, or group of individuals, that has a long shelf life.

Another object of the disclosure is to provide a chemical protective shelter system for an individual, or group of individuals, that provides visual access to and from those inside the shelter.

Yet another object of the disclosure is to provide a chemical protective shelter for an individual, or group of individuals, that is easily portable.

Another object of the disclosure is to provide a chemical protective shelter system for an individual, or group of individuals, that filters air entering the interior of the system to a safe level for breathing.

Yet another object of the disclosure is to provide a chemical protective shelter for an individual, or group of individuals, that is efficient to use.

Another object of the disclosure is to provide a chemical protective shelter system for an individual, or group of individuals, that improves the safety of not only those inside the shelter but the safety of those assisting those inside the shelter after exposure.

Yet another object of the disclosure is to provide a chemical protective shelter for an individual, or group of individuals, that can be used in practically any environment.

Another object of the disclosure is to provide a chemical protective shelter system for an individual, or group of individuals, that does not cause any kind of suffocation or risk or percentage of suffocation.

Yet another object of the disclosure is to provide a chemical protective shelter for an individual, or group of individuals, that is relatively affordable.

Another object of the disclosure is to provide a chemical protective shelter system for an individual, or group of individuals, that is high in quality and well-constructed.

Yet another object of the disclosure is to provide a chemical protective shelter for an individual, or group of individuals, that works effectively with a powered air purifying respirator.

Another object of the disclosure is to provide a chemical protective shelter system for an individual, or group of individuals, that works effectively with medical equipment.

These and other objects, features, or advantages of the disclosure will become apparent from the specification, figures and claims.

SUMMARY OF THE DISCLOSURE

A chemical protective shelter system for encapsulating and protecting an uncontaminated individual, or group of individuals, is presented. The chemical protective shelter system has a cover assembly extending a length between a top end and a bottom end and having interior surface and an exterior surface and an opening which can be opened and closed repeatedly while still sealing. The chemical protective shelter system includes a layer of media impregnated with a chemical adsorbent material capable of filtering chemical agents while allowing oxygen and carbon dioxide to pass through the material. The chemical protective shelter is specially adapted to house a plurality of people and facilitate a tent like function which would allow a person, or persons, to sleep on the interior. The system also includes a port or inlet for supplemental filtered air. The system may also include a powered air purifying respirator which positively pressures the interior space of the system.

DETAILED DESCRIPTION OF THE DISCLOSURE

Figure 1:
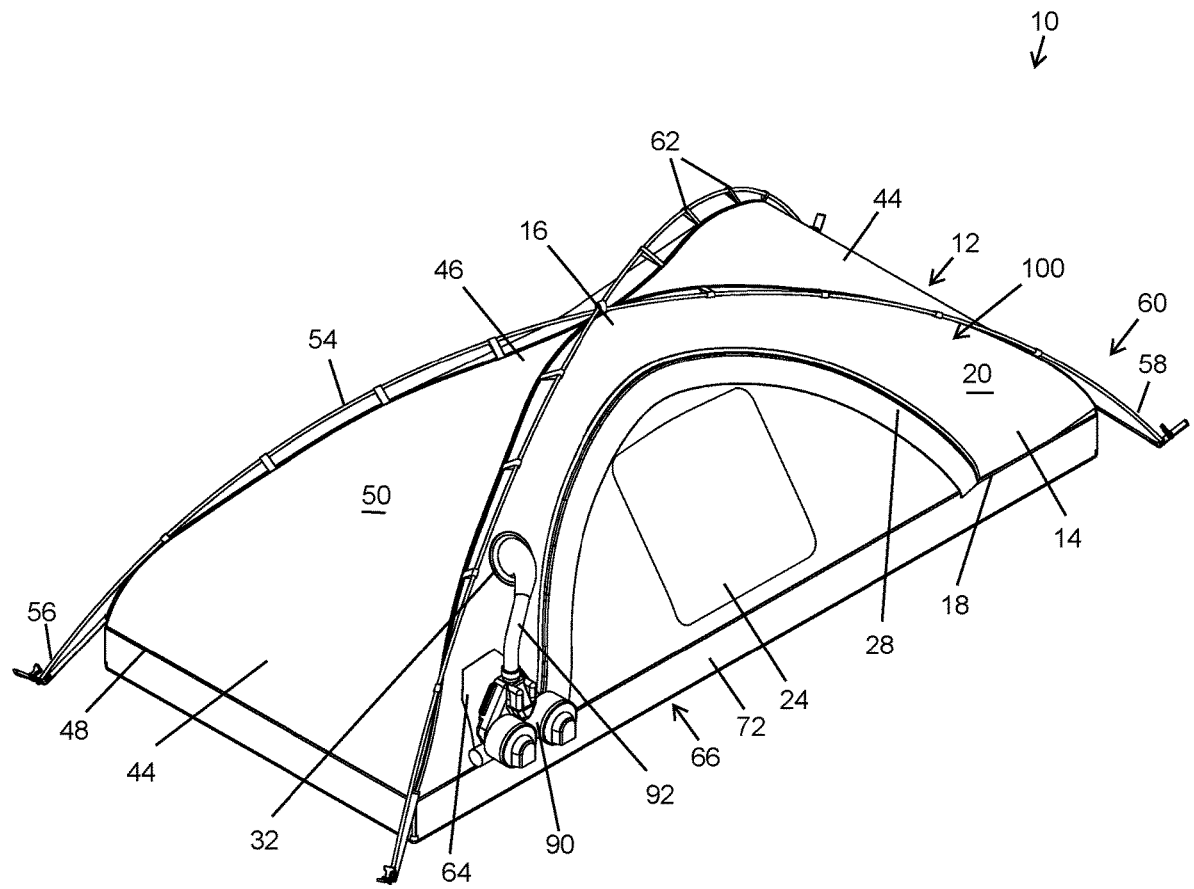
FIG. 1 shows a perspective view of a chemical protective shelter system, in accordance with one or more embodiments of the present disclosure.
Figure 2:
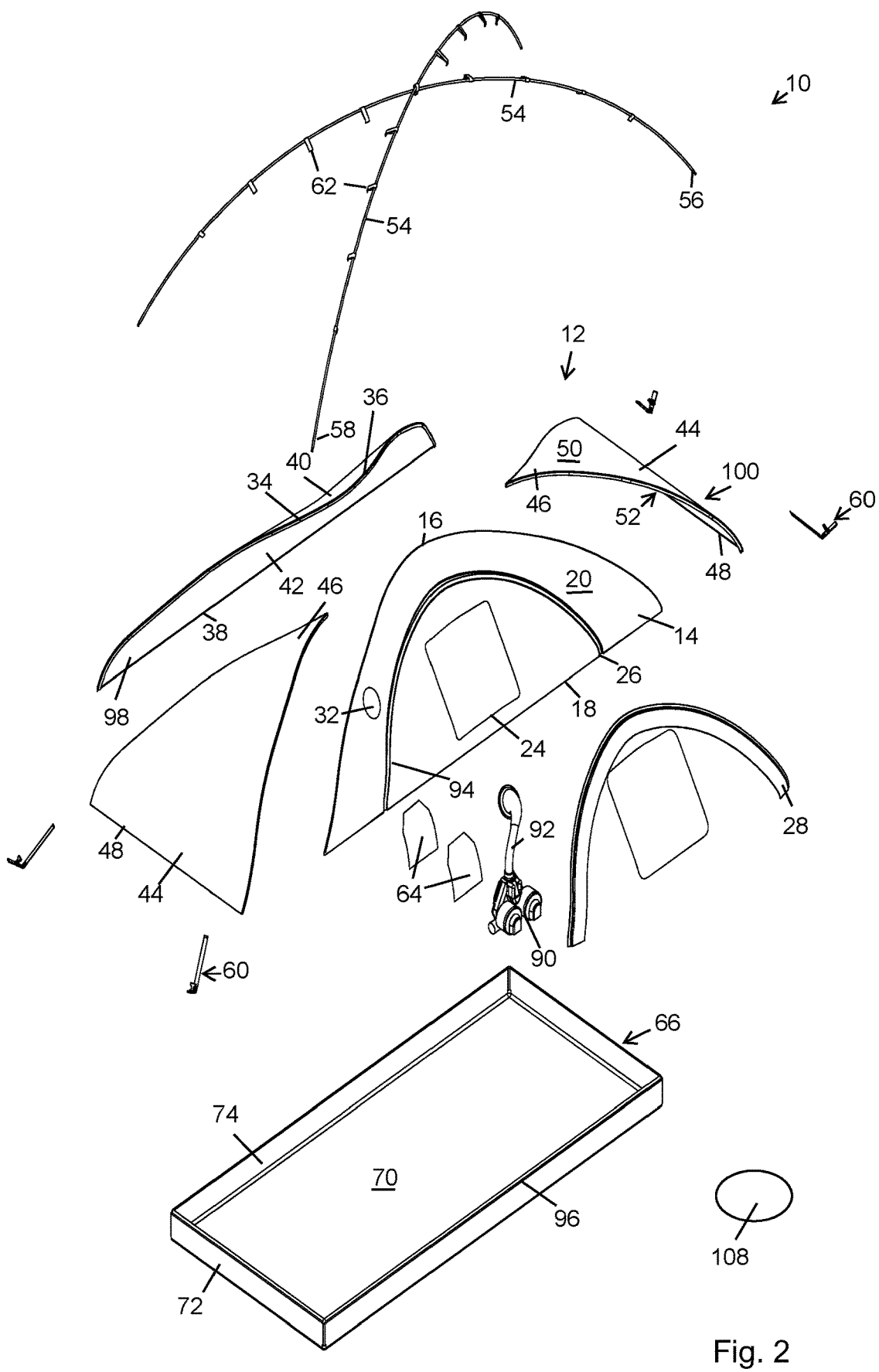
FIG. 2 shows an exploded perspective view of a chemical protective shelter system, in accordance with one or more embodiments of the present disclosure.
Figure 3:
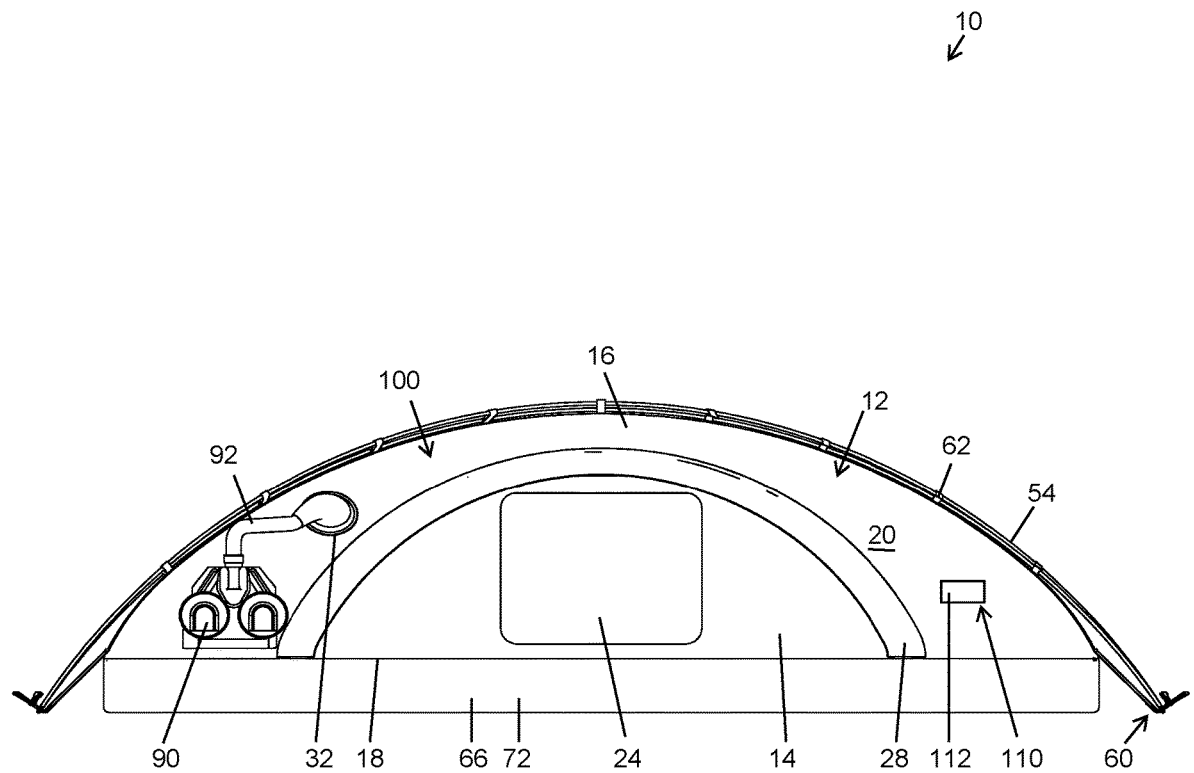
FIG. 3 shows a front view of a chemical protective shelter system, in accordance with one or more embodiments of the present disclosure.
Figure 4:
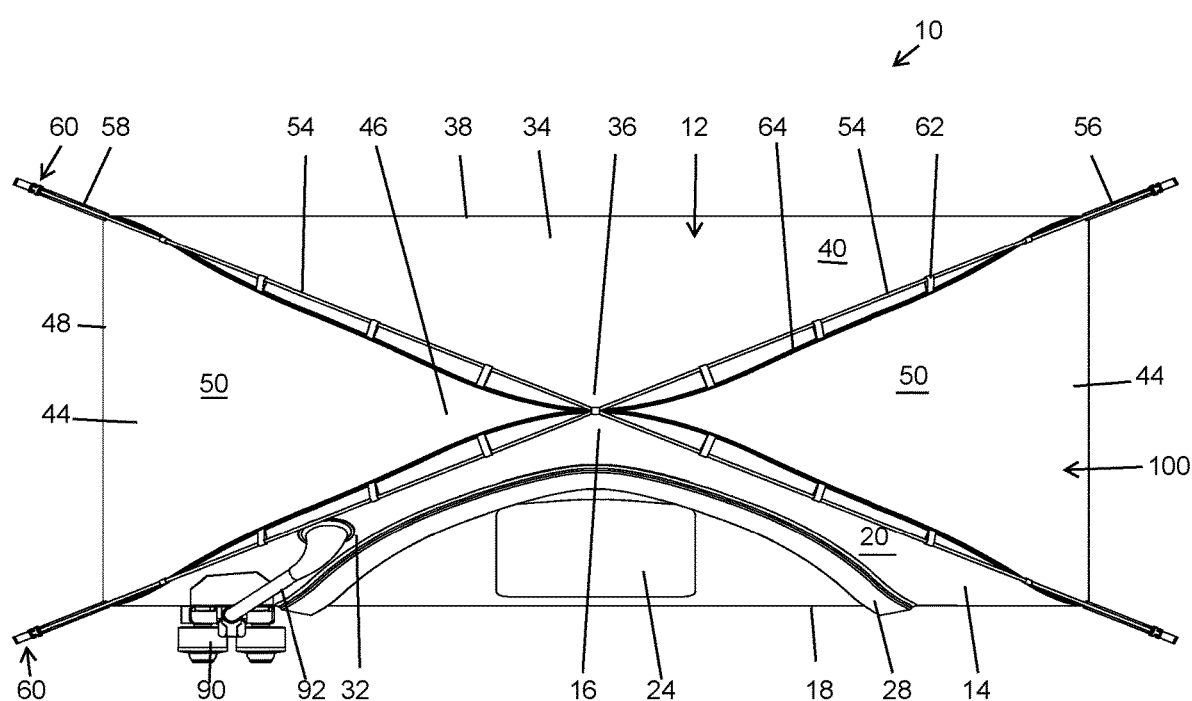
FIG. 4 shows a top view of a chemical protective shelter system, in accordance with one or more embodiments of the present disclosure.
Figure 5:
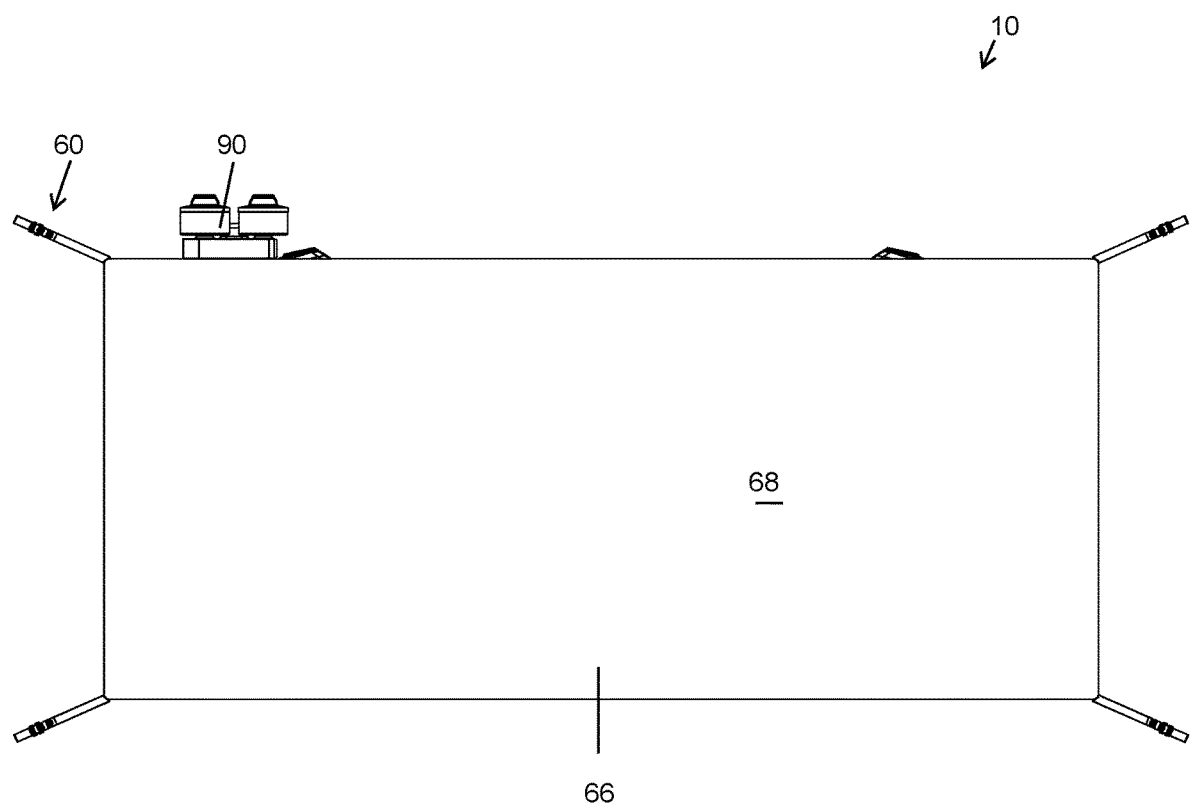
FIG. 5 shows a bottom view of a chemical protective shelter system, in accordance with one or more embodiments of the present disclosure.
Figure 6:
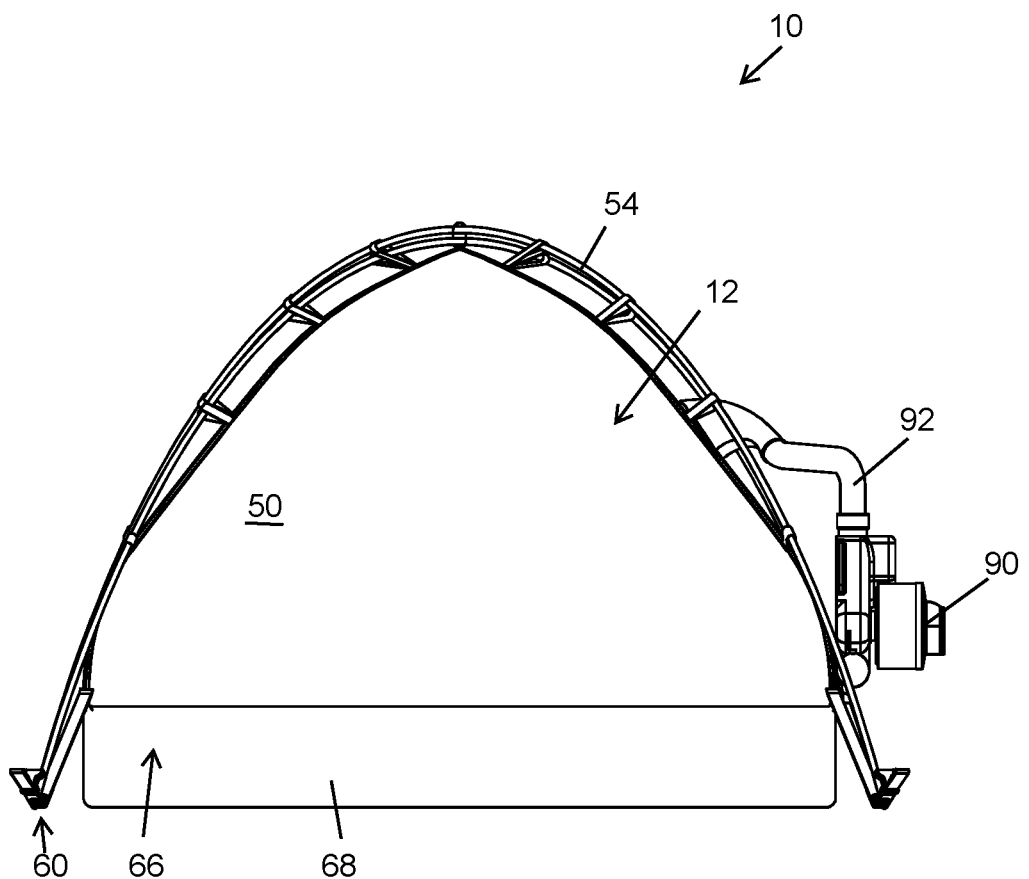
FIG. 6 shows a first side view of a chemical protective shelter system, in accordance with one or more embodiments of the present disclosure.
Figure 7:
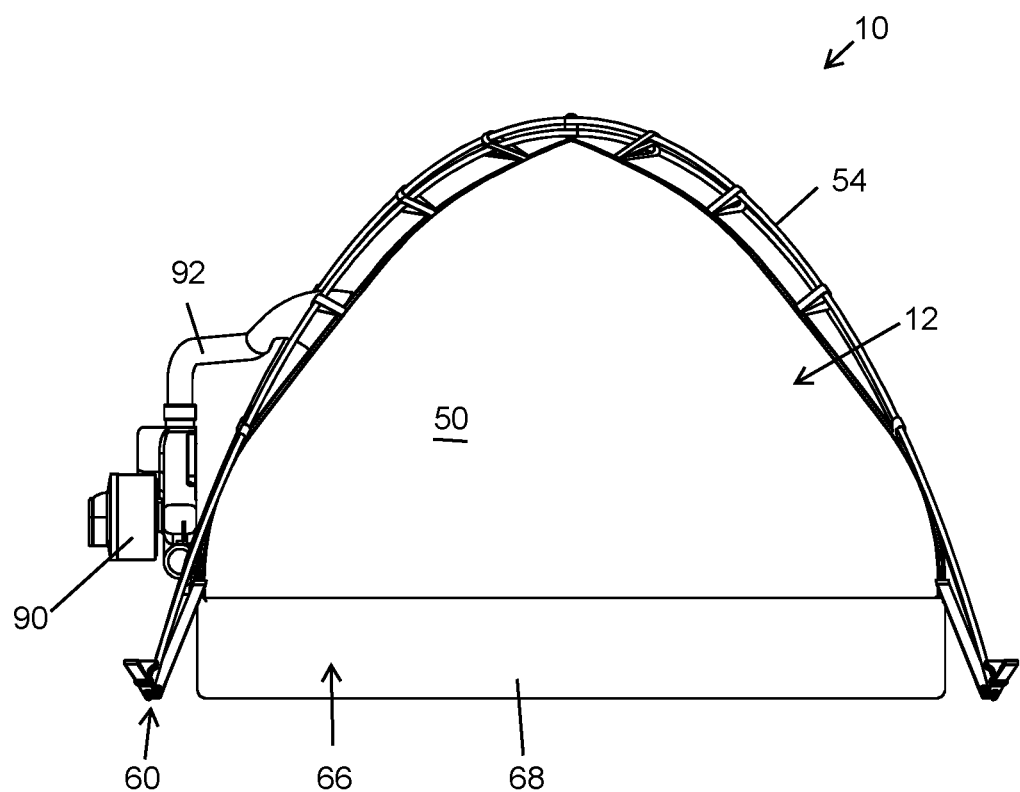
FIG. 7 shows a second side view of a chemical protective shelter system, in accordance with one or more embodiments of the present disclosure.
Figure 8:
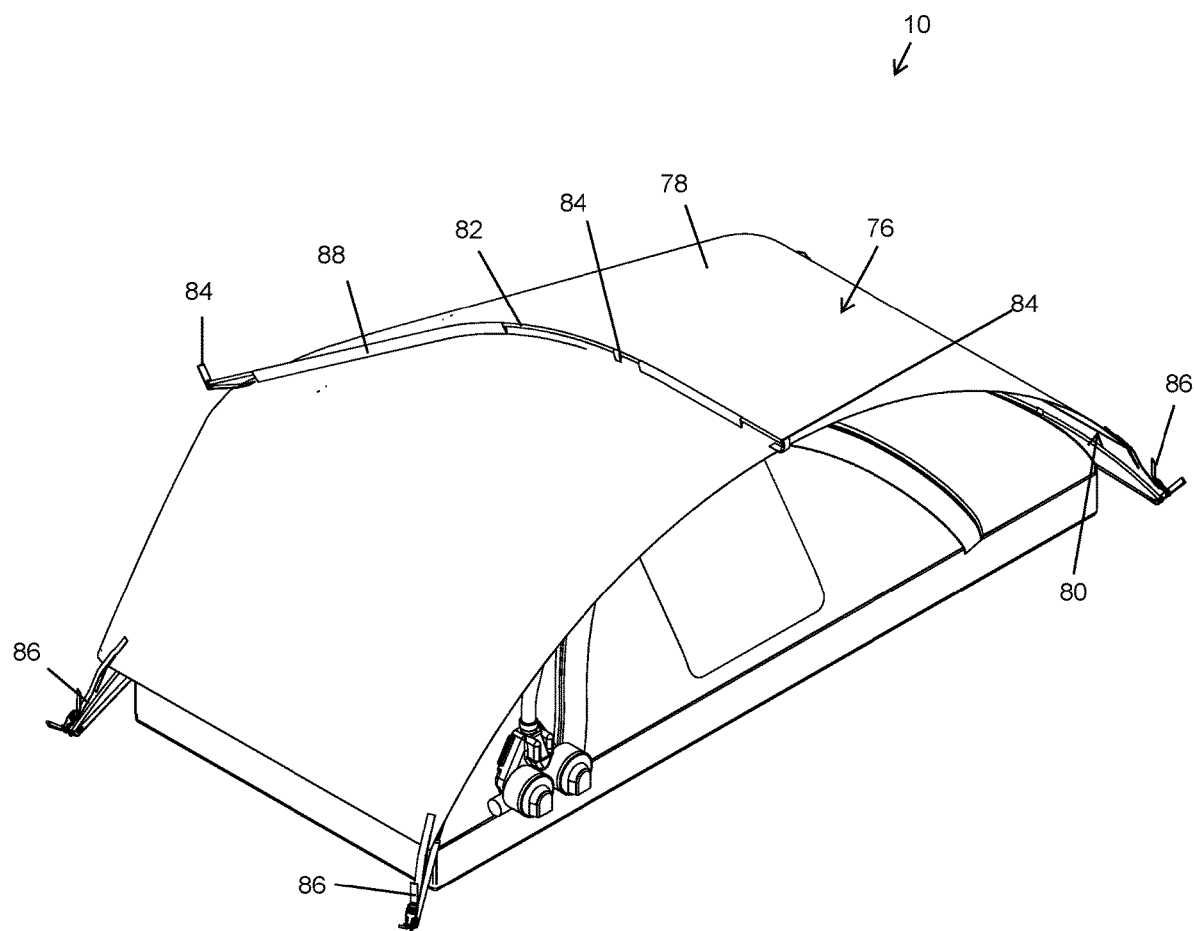
FIG. 8 shows a perspective view of a chemical protective shelter system and rain cover, in accordance with one or more embodiments of the present disclosure.
Figure 9:
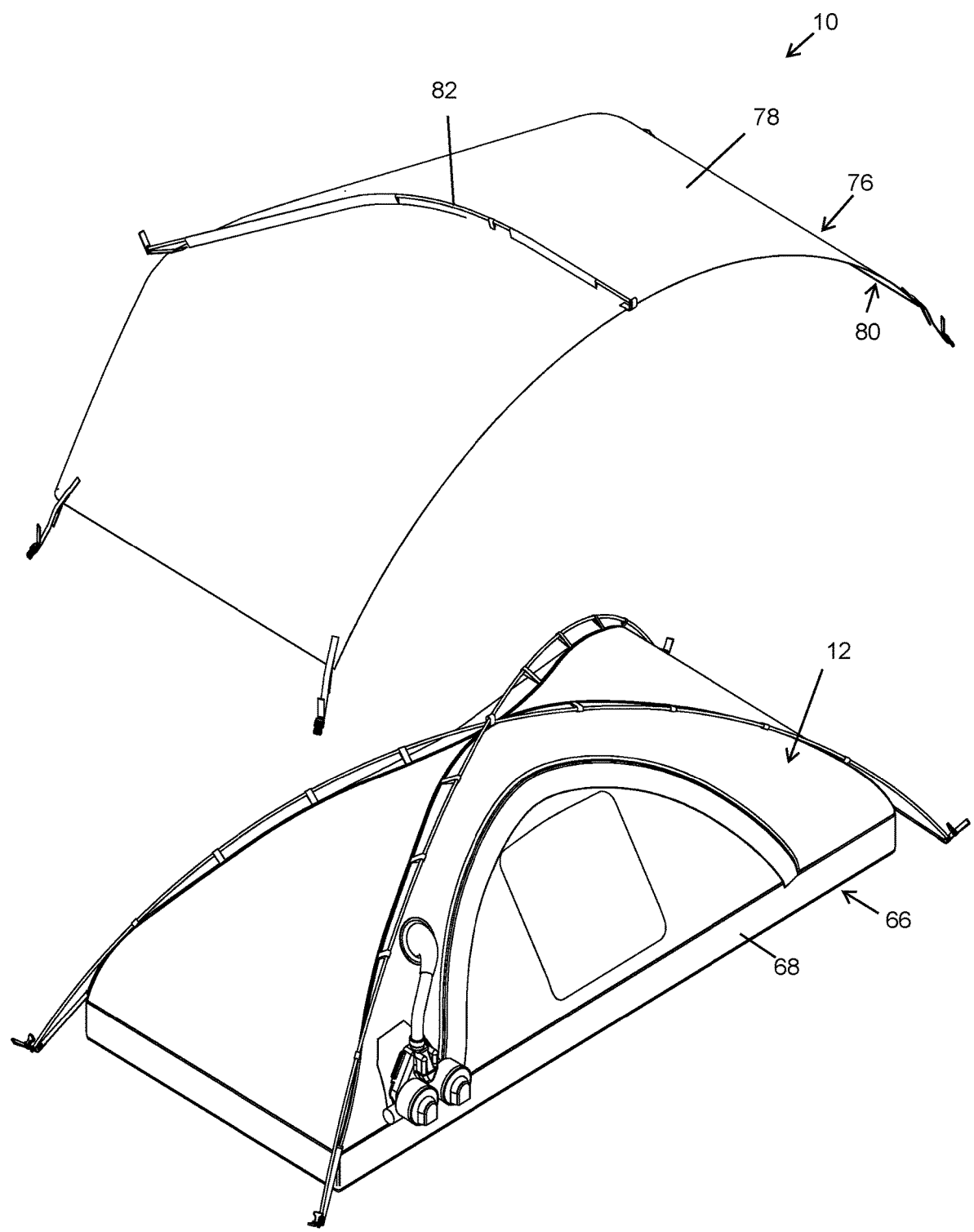
FIG. 9 shows an exploded perspective view of a chemical protective shelter system and rain cover, in accordance with one or more embodiments of the present disclosure.
Figure 10:
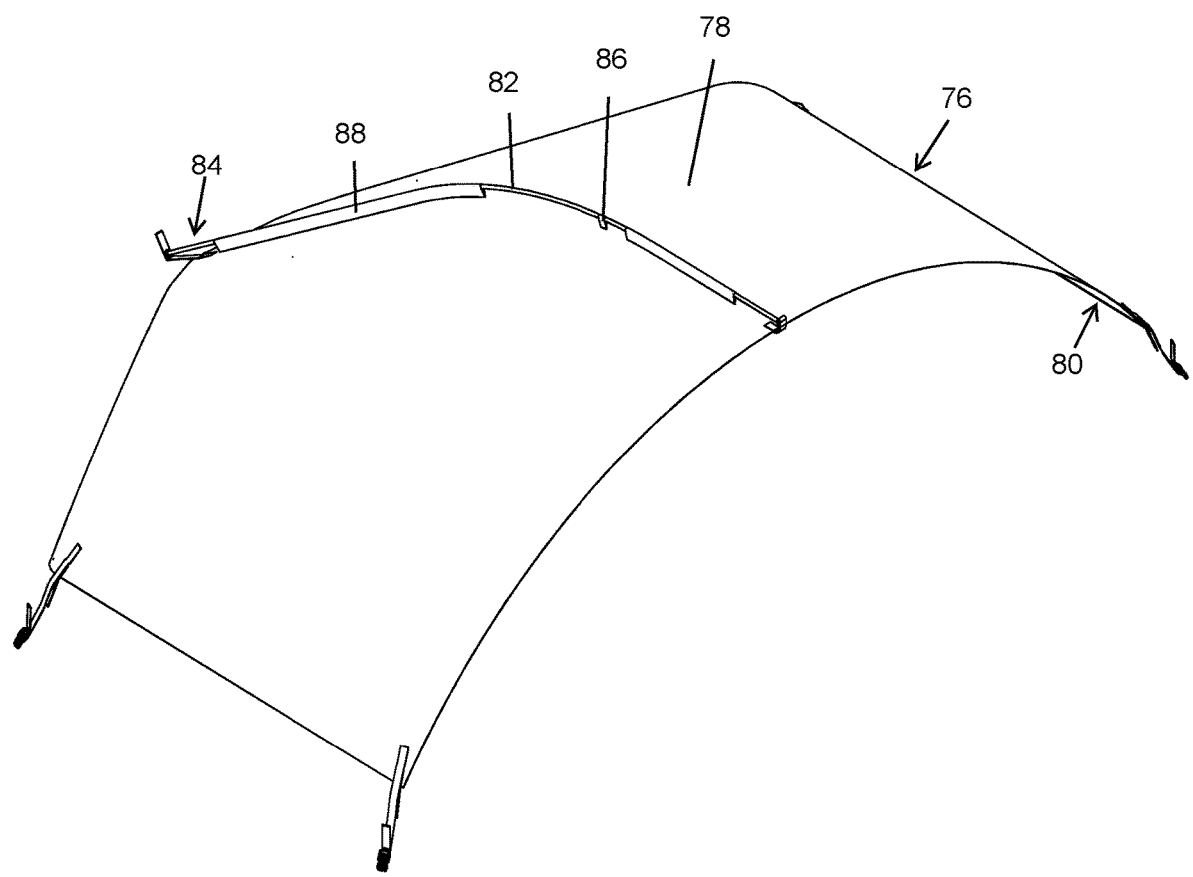
FIG. 10 shows a perspective view of a rain cover, in accordance with one or more embodiments of the present disclosure.
Figure 11:
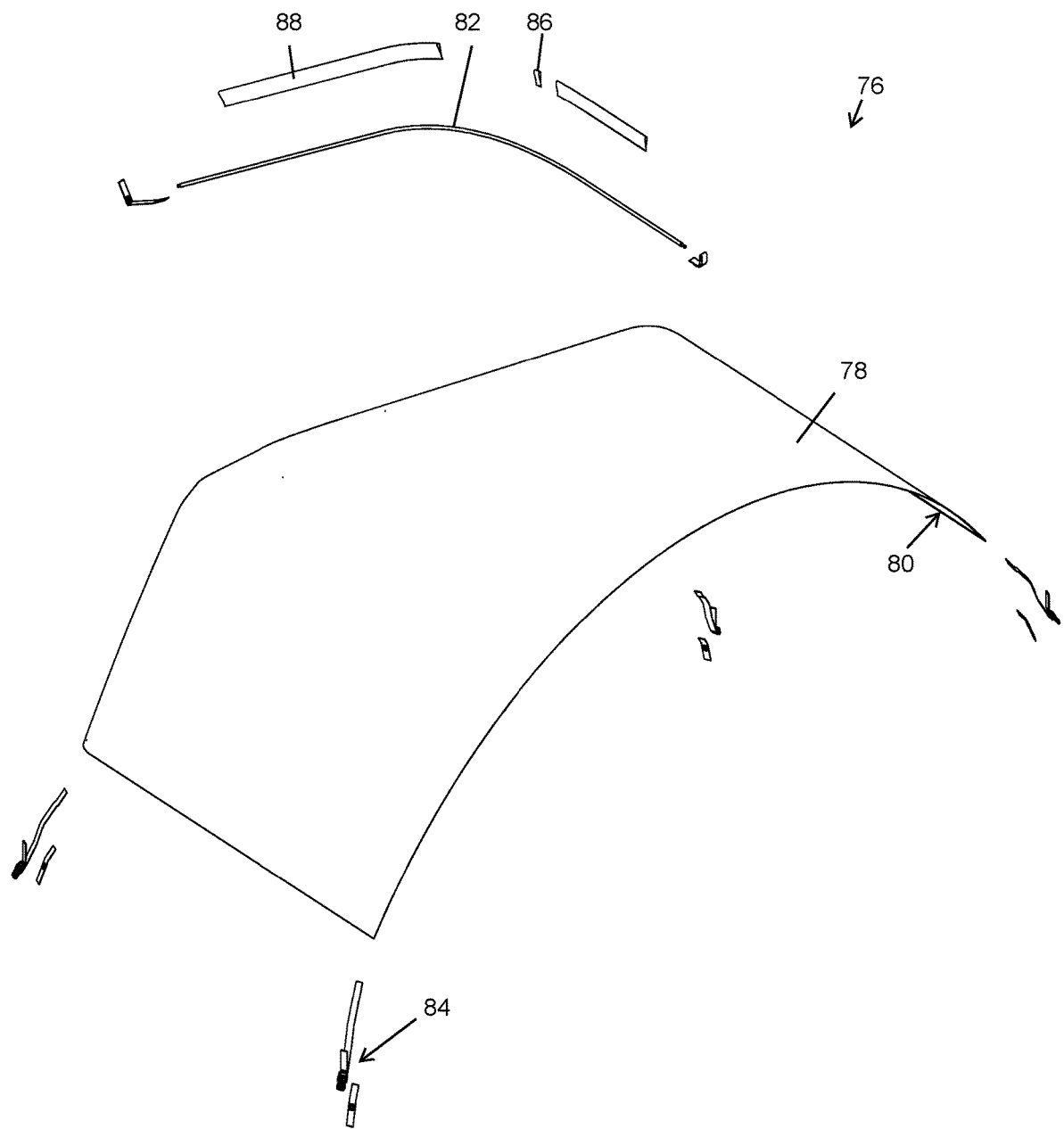
FIG. 11 shows an exploded perspective view of a rain cover, in accordance with one or more embodiments of the present disclosure.
Figure 12:
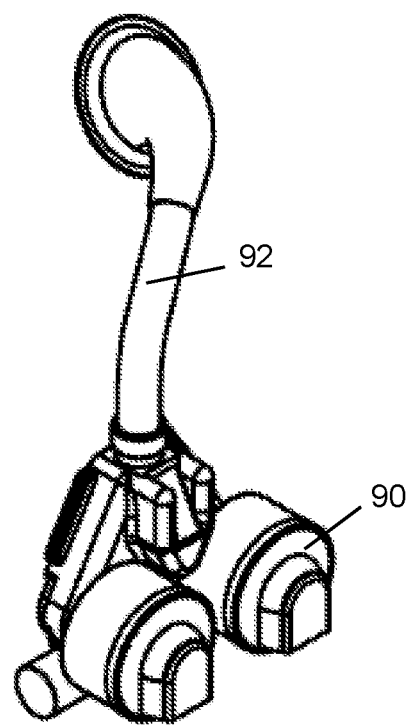
FIG. 12 shows a perspective view of a powered air purifying system, in accordance with one or more embodiments of the present disclosure.
Figure 13:
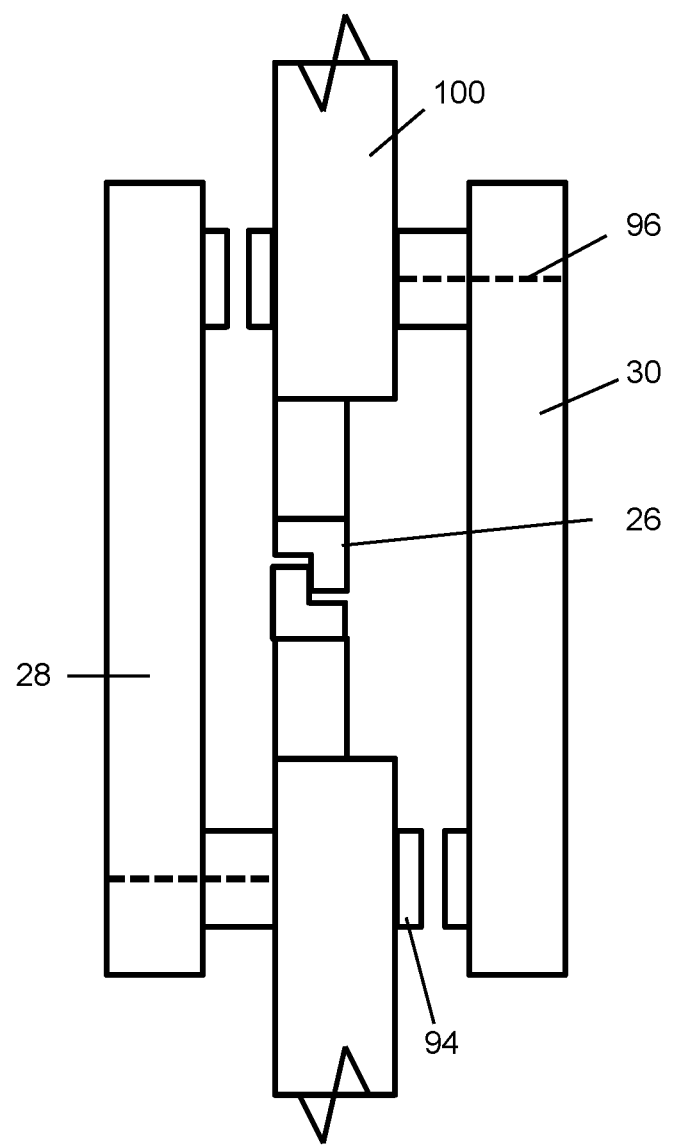
FIG. 13 shows a cross section of a zipper connecting first and second ends of fabric with an interior flap and an exterior flap covering the zipper, in accordance with one or more embodiments of the present disclosure.
Figure 14:
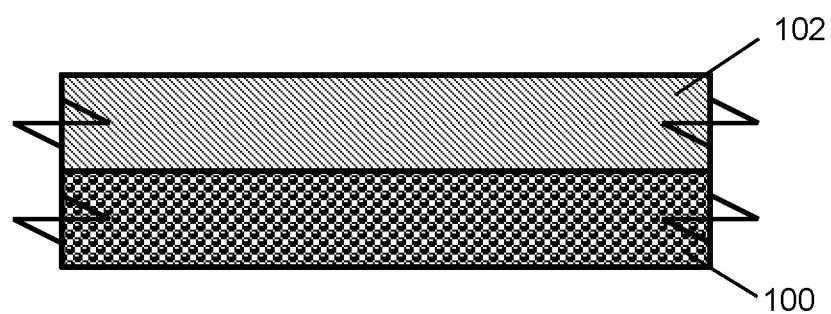
FIG. 14 shows a cross section of a laminate of an adsorbent impregnated media layer with another layer of material, in accordance with one or more embodiments of the present disclosure.
Figure 15:
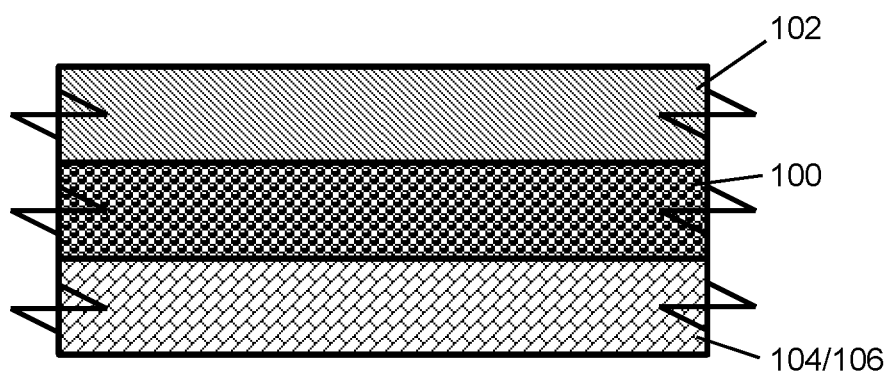
FIG. 15 shows a cross section of a laminate of an adsorbent impregnated media layer with two other layers of material, in accordance with one or more embodiments of the present disclosure.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure. Moreover, although the disclosed embodiments are primarily described in the context of military applications, the embodiments are not so limited. In is appreciated that the embodiments may be adapted for use in other applications which may be improved by the disclosed structures, arrangements and/or methods.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "A but not B," and "B but not A." As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods.

Similarly, the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

System:

A chemical protective shelter system for encapsulating and protecting an uncontaminated individual, or group of individuals, is presented. In one or more embodiments, a chemical protective shelter system has a cover assembly extending a length between a top end and a bottom end and having interior surface and an exterior surface and an opening which can be opened and closed repeatedly while still sealing. In one or more embodiments, the chemical protective shelter system includes a layer of media (e.g., a fabric or foam) impregnated with a chemical adsorbent material capable of filtering chemical agents while allowing oxygen and carbon dioxide to pass through the material. The disclosed embodiments may utilize various types of chemical adsorbent materials for filtering chemical agents including, for example, but not limited to: carbon, activated carbon, activated alumina, silica gel, molecular sieve carbon, molecular sieve zeolites and polymeric an adsorbents and various combinations thereof. For ease of reference, a media impregnated with a chemical adsorbent material may be referred to herein as an adsorbent impregnated media.

In one or more embodiments, the chemical protective shelter is specially adapted to house a plurality of people and facilitate a tent like function which would allow a person, or persons, to sleep on the interior. In some embodiments, the system may also include a port or inlet for supplemental filtered air. In some embodiments, the system may also include a powered air purifying respirator which positively pressures the interior space of the system.

With reference to the figures, for example, a chemical protective shelter system 10 for protecting a person or persons from chemical exposure, or simply system 10 is presented. The system 10 is used in association with a person, as a covering for a person, to protect a person from chemical exposure. The system 10 is used in association with a cover assembly 12. In the arrangement shown, as one example, cover assembly 12 includes a main panel 14, a side panel 34, and at least one end panel 44. In one arrangement, as is shown, the cover assembly 12 also includes a support rod 54, a strap subassembly 60, a webbing 62, and a stiffener 64, among other components. In the arrangement shown, as one example, system 10 also includes a bottom panel 66 and a rain cover 76. The system 10 is also used in association with a powered air purifying respirator 90. The system 10 is also used in association with hook and loop 94, thread 96, and an adsorbent impregnated media 100.

The system 10 is used in association with all of these components, among other features, systems, and components as is described herein and shown in the figures.

Cover Assembly:

In the arrangement shown, as one example, chemical protective shelter system 10 is includes a cover assembly 12. Cover assembly 12 may be formed of any suitable size, shape, and design and is configured to form the main housing that forms a hollow interior that shelters plurality of people. In other words, cover assembly 12 is configured to serve as the main barrier between the filtered inside air and the non-filtered outside air. In the arrangement shown, as one example, the cover assembly 12 functions as the main housing of system 10, forming the majority of the upper portion of the enclosure of system 10. Additionally, the function of the cover assembly 12 is to serve as a large filter layer allowing air to flow through the material of the cover assembly 12 while filtering chemical agents from the outside air.

In the arrangement shown, as one example, cover assembly 12 may take on the shape as the upper portion of a modern camping tent, however any other size, shape and design is hereby contemplated for use in one or more implementations. In other words, cover assembly 12 is formed of a main panel 14, a side panel 34, and a plurality of end panels 44. In the arrangement shown, as one example, cover assembly 12 forms the main outer wall of system 10. In the arrangement shown, as one example, this wall of the cover assembly 12 is formed by connections between the main panel 14, the side panel 34, and the plurality of end panels 44. In the arrangement shown, as one example, the top of these panels comes to a point at the top part of the system 10. In other words, in the arrangement shown, as one example, the cover assembly 12 extends from a peaked point at the top of the wall formed by the panels in a pyramid like fashion to the perimeter of the bottom panel 66.

Main Panel:

In the arrangement shown, as one example, cover assembly 12 is formed at least partially of the main panel 14. Main panel 14 is formed of any suitable size, shape and design and is configured to serve as the primary front surface of system 10. In the arrangement shown, as one example, main panel 14 extends a length from a top 16, at the peak of the cover assembly 12 to the bottom 18, adjacent the bottom panel 66. Main panel 14 also includes an exterior surface 20 and an interior surface 22. In the arrangement shown, as one example, the main panel 14 is generally triangular in shape with a peaked top and wide bottom.

In the arrangement shown, as one example, main panel 14 also includes a window 24. Window is formed of any suitable size, shape and design and is configured to provide an impenetrable, transparent surface for which persons on the exterior of system 10 can see into the interior of system 10. Additionally, window 24 is configured so a plurality of people on the interior can see the exterior of system 10. This helps to provide light into the interior of system 10, provide a means for the person or persons on the inside of the shelter situational awareness as well as to reduce the potential for claustrophobia.

In the arrangement shown, as one example, main panel 14 includes a sealing member 26. Sealing member 26 is formed of any suitable size, shape, and design and is configured to open and close an opening of the main panel 14 of the cover assembly 12. In the arrangement shown, as one example, sealing member 26 is a zipper. Sealing member 26 and/or zipper is formed of any suitable size, shape and design and is configured to open and close the front portion of main panel 14 so that a person, or persons, can enter and/or exit the interior of system 10. In the arrangement shown, as one example, sealing member 26 and/or zipper extends in a generally semi-circular manner to create an opening.

In the arrangement shown, as one example, sealing member 26 is a common zipper also known as a clasp locker. Clasp lockers are commonly used for binding the edges of an opening of fabric to other flexible material, such as on a garment or a bag. In the arrangement shown, as one example, the sealing member 26 is formed of two rows of protruding teeth, which are made to interdigitate, linking the rows and thus linking the two panels of fabric they are attached to. While a sealing member 26 is used in the example as shown, other fasteners are hereby contemplated for use in one or more implementations, such as, but not limited to, hook and loop, magnetic fastening, buttoning, tying, clipping, adhesions, gluing, affixing, and any other manner of interlocking or connecting two pieces of fabric, and the like.

One of the benefits of using a conventional off the shelf zipper as sealing member 26 is that conventional off the shelf zippers are inexpensive as well as widely available. One of the disadvantages of using a conventional zipper as sealing member 26 is that chemical contaminants can easily pass through the porous components of conventional zippers.

In the arrangement shown, as one example, main panel 14 and sealing member 26 is used in association with an exterior flap 28. Exterior flap 28 is formed of any suitable size, shape and design and is configured to form a complete enclosure of the main panel 14 after the person, or persons, has been zipped into the hollow interior. In the arrangement shown, as one example, exterior flap 28 extends a length of the main panel 14 from side-to-side. In the arrangement shown, as one example, exterior flap 28 coincides with sealing member 26 so as to be a length which is just slightly longer than sealing member 26 so that exterior flap 28 can completely cover sealing member 26.

In the arrangement shown, as one example, exterior flap 28 is threadably attached and sealed along one side, adjacent to sealing member 26. In the arrangement shown, exterior flap 28 is connected to main panel 14 on the top side and/or outside of sealing member 26 so that any water or moisture or settling material that lands on system 10 is directed over and away from sealing member 26. The opposite side of exterior flap 28 is free and hangs over and extends past sealing member 26 and contains a fastener 94 which in the arrangement shown is formed of a hook and loop fastener. In the arrangement shown, fastener 94 is a hook and loop fastener with one strip of hooks and an opposing strip of loops, wherein one of the strips is connected to the interior surface of exterior flap 28 and the other strip is connected to the exterior surface of main panel 14, just inward of sealing member 26. In this way, the exterior flap 28 can fold over (and enclose) the sealing member 26 when the fastener 94 strips engage. Thus, the exterior flap 28 attaches on both sides of the sealing member 26 thereby sealing the sealing member 26. This is an advantageous feature because the exterior flap 28 is made of a material that blocks or filters contaminants, such as being made of the same material as cover assembly 12. In the arrangement shown, as one example, exterior flap 28 is made of a single piece of an adsorbent impregnated media 100 such that air cannot leak through the zipper 26 without first passing through the layer of the exterior flap 28. Thus, any air passing through the zipper 26 has already been filtered by the exterior flap 28.

As an added layer of protection at the sealing member 26, cover assembly 12 may include an interior flap 30. Interior flap 30 is formed of any suitable size, shape and design. In one arrangement, interior flap 30 is configured as a protective filter layer on the interior side of the sealing member 26. Interior flap 30 is formed of generally the same shape and design of exterior flap 28, but is placed on the interior side of the sealing member 26 instead of being located on the exterior side of sealing member 26.

In this way, interior flap 30 is accessible to the person from the inside of system 10. This added layer of filtering ensures no contaminated air will enter the interior of the system 10 through sealing member. Additionally, a person has access to the interior flap 30 to ensure it is properly sealed, which is not necessarily the case with the exterior flap 28. In this way, a person can secure the interior flap 30 in the event there is not enough time to secure the exterior flap 28, or similarly, in the event the exterior flap 28 becomes unsealed by an accident. In one arrangement, as one example, interior flap 30 is formed of the same material as exterior flap 28. In other words, interior flap 30 is formed of an adsorbent impregnated media 100. Similarly, in the arrangement shown, as one example, interior flap 30 is threadably connected to cover assembly 12 and uses a fastener 94, such as a hook and loop system for engaging with cover assembly 12.

In the arrangement shown, as one example, main panel 14 includes a port 32. Port 32 is formed of any suitable size, shape and design and is configured to provide an opening or inlet for which an air tube/respiratory tube 92 can be inserted. In other words, port 32 is configured to allow a respiratory tubing 92 to extend, uninterrupted, from the exterior of the cover assembly 12 and into the interior of the cover assembly 12. Or in other words, respiratory tube 92 attaches directly to port 32. In the arrangement shown, as one example, port 32 is generally circular and located nearer the middle of the main panel 14. However, any other shape, size, or location for port 32 is hereby contemplated for use in one or more implementations.

By using and shaping port 32 in this way, port 32 allows for a passageway of air to be forced into the interior of system 10. Thus, a positive air pressure is created within system 10. In the arrangement shown, as one example, the port 32 is used in association with a respiratory tubing 92, which is further described herein, as well as with a powered air purifying respirator 90 which is further described herein. These components operate in sync to create a positive air pressure of filtered air within the hollow interior of system 10 which is facilitated through port 32.

In the arrangement shown, as one example, port 32 is an opening. The opening is configured to create a close and tight seal around respiratory tubing 92, or any other connection member. As a back-up to this seal and design, the positive air pressure of the interior of the cover assembly 12 will exit through any gaps, forcing air outwards, between the respiratory tubing 92 and the inner seam of port 32. In this arrangement, as one example, a redundancy is created such that no air leaks to the interior of system 10 without first being filtered. This arrangement is advantageous because it ensures the safety of the person or persons by ensuring that chemical agents or other harmful toxins cannot enter the interior of system 10.

Side Panel:

In the arrangement shown, as one example, cover assembly 12 is formed at least partially of the side panel 34. Side panel 34 is formed of any suitable size, shape and design and is configured to serve as the rear of system 10. In the arrangement shown, as one example, side panel 34 extends a length from a top 36, at the peak of the cover assembly 12 to the bottom 38, adjacent the bottom panel 66. Side panel 34 also includes an exterior surface 40 and an interior surface 42. In the arrangement shown, as one example, the side panel 34 is generally triangular in shape with a peak at its top and a wide bottom located opposite of the main panel 14 and in a generally mirror-image as main panel 14. In the arrangement shown, as one example, the side panel 34 connects to the main panel 14 at the top of the cover assembly 12. Additionally, the side panel 34 connects along its sides to the plurality of end panels 44.

End Panel:

In the arrangement shown, as one example, cover assembly 12 is formed at least partially of a plurality of end panels 44, in the arrangement shown, as one example, a pair of opposing end panels 44 are positioned between main panel 14 and side panel 34. End panel 44 is formed of any suitable size, shape and design and is configured to serve as the ends of system 10. In the arrangement shown, as one example, end panels 44 extends a length from a top 46, at the peak of the cover assembly 12 to the bottom 48, adjacent the bottom panel 66. End panels 44 also include an exterior surface 50 and an interior surface 52. In the arrangement shown, as one example, the end panels 44 are generally triangular in shape with a wide bottom positioned adjacent the bottom of main panel 14 and the side panel 34. In the arrangement shown, as one example, the end panels 44 connects to the main panel 14 at the top of the cover assembly 12 and the side panel 34. Additionally, the side panel 34 connects along its sides to the plurality of end panels 44.

In the arrangement shown, one main panel 14, one side panel 34, and two end panels 44 are used to form the cover assembly 12. However, any other number of panels is hereby contemplated for use in one or more implementations. In an alternative arrangement, cover assembly 12 is formed a single, unitary piece.

Support Rod:

In the arrangement shown, as one example, cover assembly 12 is supported by at least one support rod 54. In the arrangement shown, two support rods 54 are shown in use. Support rods 54 extend a length from a first end 56 to a second end 58. Support rods 54 are configured to support the system 10. In the arrangement shown, as one example, two support rods 54 are arranged in a cross to support the system 10 in a pyramid like shape. While two support rods 54 are shown, any number of support rods 54 are hereby contemplated for use including one support rod 54, two support rods 54, three support rods 54, four support rods 54, or more. In the arrangement shown, as one example, support rods 54 may be formed of a plurality of lengths that connect to one another to form a single continuous elongated member, while also allowing the support rods 54 to be collapsed transport.

Supporting Features:

In the arrangement shown, as one example, cover assembly 12 includes webbing 62. Webbing 62 is formed of any suitable size, shape and design and is configured to operably connect the cover assembly 12 to the plurality of support rods 54. In the arrangement shown, as one example, webbing 62 is formed of a plurality of loops connected to cover assembly 12 that allow support rods 54 to extend there through thereby facilitating connection of support rods 54 to cover assembly 12. In the arrangement shown, as one example, the cover assembly 12 also includes a strap subassembly 60. Strap subassemblies 60 are formed of any suitable size, shape and design and are configured to receive and hold the ends of support rods 54 and connect them to the corners of cover assembly 12. Strap subassemblies 60 are also configured to operably support and/or attach the other supporting features of system 10 to the ground and/or surface on which system 10 is placed.

In the arrangement shown, as one example, system 10 also includes a stiffener 64. Stiffener 64 is formed of any suitable size, shape and design and is configured to stabilize a portion of the main panel 14 so the powered air purifying respirator 90 has a strengthened surface of the main panel 14 to attach to. Stiffener 64 may also serve as an attachment means for attaching powered air purifying respirator 90 to chemical protective shelter system 10 and may include buttons, straps, ties, loops, pockets, zippers, hook and loop fasteners, and/or any other fastening or attachment member or any combination thereof. Powered air purifying respirator 90 is further described herein.

Bottom Panel:

In the arrangement shown, chemical protective shelter system 10 is used in association with a bottom panel 66. Bottom panel 66 may be formed of any suitable size, shape and design and is configured to enclose the lower end of system 10.

In the arrangement shown, as one example bottom panel 66 is generally flat and rectangular in shape and is formed of a panel of material. In the arrangement shown, as one example, bottom panel 66 includes an exterior surface 68, an interior surface 70. In the arrangement shown, as one example, bottom panel 66 extends upward at its ends at opposing end walls 72 and at its forward and rearward sides at sidewalls 74. When bottom panel 66 is formed of a water proof or impermeable material, the upward extension of end walls 72 and sidewalls 74 provides a layer of protection as the bottom panel 66 shields the chemical protective shelter system 10 from the intrusion of water or contaminants from the ground and for several inches up from the ground. In addition, the presence of the water proof or impermeable material of bottom panel 66 shields the permeable or breathable material that forms other portions of chemical protective shelter system 10 from contamination at their lower end, such as main panel 14, side panel 34 an end panels 44. Bottom panel 66 is attached to the cover assembly 12 along the end walls 72 and sidewalls 74 of the bottom panel 66 along the entire perimeter of the upper end of bottom panel 66.

In the arrangement shown, as one example, bottom panel 66 is made from a waterproof and/or an impermeable material. In the arrangement shown, as one example, bottom panel 66 is covered from above by the cover assembly 12 of system 10. In the arrangement shown, as one example, the cover assembly 12 acts as the filtering material for system 10. The surface area of this component is enough to facilitate in adequate air turnover. Thus it is advantageous to use an impermeable material for the bottom panel 66. In this way, a more efficient and cost-saving device can be created. In the arrangement shown, as one example, bottom panel 66 is formed of a polyethylene coated and laminated cloth. However, any other material of bottom panel 66 is hereby contemplated for use, including but not limited to, a bottom panel 66 made from an adsorbent impregnated media 100.

Rain Cover:

In the arrangement shown, as one example, chemical protective shelter system 10 is used in association with a rain cover 76. Rain cover 76 may be formed of any suitable size, shape and design and is configured to cover system 10 and repel rain and other falling precipitation or liquid chemical agents from coming into contact with system 10. In the arrangement shown, as one example, rain cover 76 is configured to lie over and cover the top of the cover assembly 12 and forms a similar shape as the cover assembly 12 with a similar size and design.

In the arrangement shown, as one example, rain cover 76 is generally flat and rectangular in shape and is formed a panel of material having a top surface 78 and a bottom surface 80. In the arrangement shown, as one example, the bottom surface 80 is placed over the top of the cover assembly 12 in a spaced alignment such that a cushion of air is positioned between bottom surface 80 and the top of cover assembly 12.

In the arrangement shown, as one example, the rain cover 76 is made of a waterproof and impenetrable material such that when water, rain, moisture, chemical agents or contaminants land on chemical protective shelter system 10 the water, rain, moisture, chemical agents or contaminants land on rain cover 76 and are deflected or shed away from engaging other portions of chemical protective shelter system 10. This feature is important when the material that forms portions of cover assembly 12, such as main panel 14, side panel 34 an end panels 44 is a permeable material, such as a an adsorbent impregnated media 100, as the material properties of this material may be negatively affected when it gets wet and/or if it is directly engaged by contaminants. As such, if the permeable portions of cover assembly 12, such as main panel 14, side panel 34 an end panels 44 get wet or contaminated, this can affect the material's ability to filter air and prevent contaminants from entering the hollow interior of the system 10, as well as this can affect the amount of filtered air that may penetrate into the hollow interior of the chemical protective shelter system 10. In either case, if water, moisture, and/or contaminants directly engage the material of permeable portions of cover assembly 12, such as main panel 14, side panel 34 an end panels 44, this moisture and/or contamination may affect the life-sustaining ability of the system 10.

Shielding the upward facing surfaces of cover assembly 12, such as main panel 14, side panel 34 an end panels 44, is also important in a chemical, biological and/or radiological contamination zone as these contaminants tend to settle out of the air and land on whatever is below them. As such, covering the upper surface of cover assembly 12, such as main panel 14, side panel 34 an end panels 44 prevents contaminants from engaging the permeable portions of system 10 such as cover assembly 12, main panel 14, side panel 34 an/or end panels 44. If these contaminants cannot reach the cover assembly 12, such as main panel 14, side panel 34 an end panels 44, these contaminants cannot penetrate the hollow interior of the cover assembly 12. As such, this may improve the life-sustaining capabilities of the system 10.

Also, by positioning a space between the bottom surface 80 of rain cover 76 and the upper surface of cover assembly 12, such as main panel 14, side panel 34 an end panels 44, this facilitates the free flow of air through the permeable material that forms cover assembly 12, such as main panel 14, side panel 34 an end panels 44. As such, the presence of a rain cover 76 over cover assembly 12, such as main panel 14, side panel 34 an end panels 44, ensures chemical protective shelter system 10 facilitates the life-sustaining filtering of contaminated air regardless of precipitation and/or fall-out from a chemical, biological and/or radiological attack. In addition, in no way does the installation of rain cover 76 formed of an impenetrable and/or water proof material inhibit or reduce the life-sustaining capabilities of system 10. That is, the installation of rain cover formed of an impenetrable and/or water proof material does not materially reduce the amount of air that penetrates through and/or is filtered by the system 10

In an alternative arrangement, rain cover 76 is formed of an adsorbent impregnated media 100 allows clean air to filter into the cover assembly 12

In the arrangement shown, as one example, rain cover 76 is connected to system 10 using a support rod 82, strap subassemblies 84, end straps 86 and retaining sleeves 88, among other features, systems and components.

Support rod 82 may be formed of any suitable size, shape and design and is configured to connect rain cover 76 to cover assembly 12 while providing strength and rigidity to rain cover 76. In the arrangement shown, as one example, support rod 82 is an elongated cylindrical member that extends a length between opposing ends, with one end positioned above the approximate center of main panel 14 and the other end positioned above the approximate center of side panel 34. Support rod 82 may be formed of a single member, or, may be formed of a plurality of lengths that connect to one another to form a single continuous elongated member, while also allowing the support rods 82 to be collapsed or broken down for transport. In the arrangement shown, as one example, the placement of support rod 82 in engagement with rain cover 76 causes the rain cover 76 to be raised above the upper surface of cover assembly 12, such as main panel 14, side panel 34 an end panels 44, by a distance thereby ensuring an air gap between rain cover 76 and cover assembly 12.

In the arrangement shown, as one example, support rod 82 extends the forward and rearward ends of rain cover 76 outward and over the main panel 14 and side panel 34 a distance so as to provide an overhang that covers and/or shields the main panel 14 and side panel 34. The presence of support rod 82 also provides a level of tautness to rain cover 76.

In the arrangement shown, as one example, rain cover 76 includes strap subassemblies 84, end straps 86 and retaining sleeves 88 that facilitate connection of rain cover 76 to cover assembly 12 as well as to support rod 82. In the arrangement shown, as one example, rain cover 76 includes strap subassemblies 84 which are formed of loops that receive and allow the passage of support rod 82 there through as well as capture the ends of support rod 82. In the arrangement shown, as one example, rain cover 76 also includes retaining sleeves 88 that form elongated loops that receive and allow the passage of support rod 82 there through. The combination of strap subassemblies 84 and retaining sleeves 88 facilitate a strong and secure connection between support rod 82 and rain cover 76.

In the arrangement shown, as one example, end straps 86 are connected to each corner of rain cover 76 and adjustably connect the corners of rain cover 76 to the ends of cover assembly 12 and/or support rods 54. In the arrangement shown, as one example, end straps 86 engage and/or hold on to the ends of support rods 54 and/or the corners of cover assembly 12 and are adjustable in length so as to facilitate adjustment of the tightness or tautness of rain cover 76.

The combination of the strap subassemblies 84, end straps 86 and retaining sleeves 88 provide an arrangement wherein rain cover 76 may be quickly, easily and tightly connected over cover assembly 12 so as to facilitate comprehensive covering of cover assembly 12.

Powered Air Purifying Respirator:

In the arrangement shown, chemical protective shelter system 10 may be used in association with a powered air purifying respirator 90. Powered air purifying respirator 90 may be formed of any suitable size, shape and design and is configured to supply clean, filtered air to the interior space of system 10.

A powered air purifying respirator 90 is any type of personal protective equipment used in situations to protect a human from breathing in contaminated air. Powered air purifying respirators 90 may consist of a respirator adapted for use by mounting on system 10. Powered air purifying respirators 90 takes in ambient air that is contaminated with one or more pollutant or pathogen, actively remove (filter) a sufficient portion of these hazards from the air, and then delivers the clean air to the space within the system 10.

Powered air purifying respirators 90 are well known in the art and are used in a variety of applications. In this case, an appropriately sized powered air purifying respirator 90 is selected for the volumetric space within system 10 as well as the number of people contained within the system 10. In the arrangement shown, a powered air purifying respirator 90 may be attached directly to the cover assembly 12 of system 10, or the powered air purifying respirator 90 may be attached to an attachment member associated with cover assembly 12 and/or stiffener 64. In another alternative arrangement, as another example, a powered air purifying respirator 90 may be a mask attached to an individual's face, located on the interior of the system 10. A powered air purifying respirator 90 must be conveniently sized and shaped to be portable but must be large enough to have the power and/or capability needed to supply the interior of system 10 with an adequate clean air supply.

In the arrangement shown, as one example, powered air purifying respirator 90 is attached to the front of the cover assembly 12. Powered air purifying respirator 90 is connected to respiratory tubing 92 which is connected to the port 32. In the arrangement shown, as one example, the powered air purifying respirator 90 cleans and/or filters the outside air before forcing the air through the respiratory tubing 92 and into the port 32 where the clean air is expelled into the interior space of system 10.

In an alternative arrangement, respiratory tubing 92 is not required. In this arrangement, as one example of a configuration of a powered air purifying respirator 90, the powered air purifying respirator 90 attaches directly to the port 32, thus expelling clean and/or filtered air directly into the interior space of the cover assembly 12. In yet another alternative arrangement, powered air purifying respirator 90 may be built into the material of cover assembly 12 and may be formed as an integral part of cover assembly 12 instead of a potential accessory where and when available.

Adsorbent Impregnated Media:

In the arrangement shown, chemical protective shelter system 10 is used in association with an adsorbent impregnated media 100. An adsorbent impregnated media 100 may be formed of any suitable size, shape and design and is configured to be selectively permeable in that an adsorbent impregnated media 100 allows air to pass through the material while it filters chemical agents from the air entering the interior of system 10. The adsorbent impregnated media may include any suitable chemical adsorbent material configured and arranged to filter one or more chemical agents of concern. Depending on the chemical agents to be filtered, chemical adsorbent material utilized in different implementations may include, for example, carbon, activated carbon, activated alumina, silica gel, molecular sieve carbon, molecular sieve zeolites and polymeric adsorbents and/or various combinations thereof. Additionally or alternatively, in one or more embodiments, the fabric may include one or more materials configured to filter microbial contaminants.

In the arrangement shown, as one example, an adsorbent impregnated media 100 is formed of a tricot knit nylon cloth laminated to polyurethane foam and impregnated with an activated carbon mixture, and/or containing a layer of activated carbon. However, the embodiments are not so limited. Rather, chemical adsorbent material may be impregnated into any suitable type of media, which may include but is not limited to various types of fabric (e.g., woven, knitted, felted and/or non-woven fabrics) and/or non-fabric material (e.g., foam), Furthermore, in various implementations, the media may be formed from various organic and/or synthetic materials known in the art.

In the arrangement shown, as one example, cover material 12 is formed almost exclusively of an adsorbent impregnated media 100. In one arrangement, bottom panel 66 may be formed at least partially of the adsorbent impregnated media 100. More specifically, in one arrangement, cover assembly 12, including main panel 14, side panel 34, and end panels 44 are formed of an adsorbent impregnated media 100. In the arrangement shown, as one example, the bottom panel 66 is not formed of an adsorbent impregnated media 100. However, forming the bottom panel 66 from an adsorbent impregnated media 100 is hereby contemplated for use in one or more implementations. Additionally, other smaller additional covering components, such as a small covering for the port 32 and/or the intravenous port may or may not be formed of an adsorbent impregnated media 100 depending on the purpose of the component and the application.

In the arrangement shown, as one example, an adsorbent impregnated media 100 is formed of multiple layers which work in concert with one another to filter chemical agents from the air entering the interior of the system 10. In the arrangement shown, as one example, an adsorbent impregnated media 100 includes at least one layer of carbon material which acts as the main filter for chemical agents.

In the arrangement shown, as one example, all seams (whether threaded or not) are hermetically seam-sealed using a seam seal for protection against chemical agents. This prevents air from passing into the hollow interior of the system 10 along the holes formed by stitching. However, other means of sealing seams are hereby contemplated for use in one or more implementations.

In the arrangement shown, as one example, two layers are used to create the fabric 100. In the arrangement shown, as one example, a carbon impregnated cloth layer and a durable water resistant layer 102. The durable water resistant layer 102 forms the outer portion of the carbon impregnated layer of the fabric 100 so as to keep water and other moisture from penetrating the carbon activated layer. If water were to penetrate the carbon activated layer, the activated carbon would diminish in effective filtering. Water resistant layer 102 may be a separate layer of fabric placed over the adsorbent impregnated media 100 in places or over the whole system 10. Alternatively, water resistance layer 102 may be a sprayed-on layer or coating that is placed over some or all of system 10.

In the arrangement shown, as one example, an adsorbent impregnated media 100 may also be used in association with an inner layer 98. Inner layer 98 is formed of any suitable size, shape and design and is configured to provide comfort for those inside system 10. In the arrangement shown, as one example, the inner layer 98 lines at least a portion of the interior surface of the cover assembly 12; providing comfort for those on the interior which may touch or rub the interior surface of the system 10. Additionally, inner layer 98 may line at least a portion of the interior surface 70 of the bottom panel 66. In some arrangements, the adsorbent impregnated media 100 is not comfortable to touch, so the inner layer 98 provides a comfortable surface for the users.

However, an alternative number of layers or filtering materials are completed for use as an adsorbent impregnated media 100 and for fabric, in general, in use with system 10. As an example, layers of fabric which are biological contaminant filtering may be desired. In the arrangement shown, as one example, a HEPA layer 104 is used for filtering harmful biological agents. As another example, a radiological resistant/filter 106 may be desired. In an alternative embodiment, a plurality of layers can be added to the fabric such that the fabric filters chemical, biological and nuclear contaminants. As yet another example, in one or more embodiments, one or more materials layered with the adsorbent impregnated media may be configured to limit a maximum rate at which air is permitted to pass through the adsorbent impregnated media. In various implementations, the flow restrictive material may be selected, for example, so that the permitted flow rate does not exceed the maximum rate at which the adsorbent impregnated media can filter hazardous contaminants.

In Operation:

The chemical protective shelter system 10 may be carried by warfighters on the battle field, stored in vehicles in the battle, stored by persons in environments that are under threat chemical, biological and/or radiological attack, stored by persons in areas in close proximity to industrial complexes storing or using chemicals, or anywhere else they may be needed.

The chemical protective shelter system 10 may be stored for long periods of time so long as they are sealed within an impervious wrap 108 (not shown). Impervious wrap 108 may be any covering that shields the chemical protective shelter system 10 from exposure to air, such as a plastic bag or plastic container or any other air-tight sealing member.

When chemical protective shelter system 10 is needed, such as a chemical, biological or radiological attack, the chemical protective shelter system 10 is removed from the impervious wrap 108, and the system 10 is erected. The chemical protective shelter system 10 may be quickly and easily erected due to its design by assembling and installing support rods 54. The installation of support rods 54 into cover assembly 12 causes the cover assembly 12 to take on a three-dimensional shape with a hollow interior. In the event that time allows, and it is necessary and/or desired, rain cover 76 is installed over cover assembly 12.

Once the shelter is erected the exterior flap 28 is opened providing access to the sealing member 26. Next, the sealing member 26 of the main panel 14 is opened to allow access to the interior flap 30. Next, the interior flap 30 is opened providing access into the hollow interior of the system 10.

Next, one or more persons enter the interior of the system 10 through the opened main panel 14. Once all occupants enter the hollow interior of system 10, the main panel 14 may again be sealed. This is accomplished by closing the sealing member 26 from the interior of system 10. Next, the occupants fold the interior flap 30 over the sealing member 26 on the interior of system 10 to create a complete filter surface overlapping the seam of the sealing member 26. In doing so, the exterior flap 28 naturally engages the exterior surface of main panel 14 thereby providing an exterior layer of protection.

Optionally, when available, a powered air purifying respirator 90 may be used if it is determined that additional air should be delivered to the interior of the system 10. If the powered air purifying respirator 90 is not already attached to the port 26, it is attached to the port 32 and then powered on prior to the occupants getting into the hollow interior of the system 10. This will deliver clean air to the interior of the system 10 for an elongated period of time, and preferably longer than any threat of a chemical, biological and/or radiological attack.

When occupants are present within the hollow interior of the chemical protective shelter system 10 air is naturally filtered through an adsorbent impregnated media 100 thereby providing life-sustaining clean and filtered air within the hollow interior of the chemical protective shelter system 10. Also, when persons are within the chemical protective shelter system 10 they are able to see through the window 24 of the main panel 14 providing situational awareness and thereby also reducing the potential for claustrophobia. The occupants may safely reside within the hollow interior of the chemical protective shelter system 10 until all threat of a chemical, biological and/or radiological attack has passed.

Additionally, the chemical protective shelter system 10 may be used to sleep in when the threat of a chemical, biological and/or radiological attack exists. In one arrangement, in the event of a chemical, biological and/or radiological attack, and a warfighter is injured and their personal protective gear is compromised or not able to be donned, the injured warfighter and a medic or other first responder can climb into the chemical protective shelter system 10, where they are protected thereby allowing the medic or first responder to treat the injured warfighter.

The chemical protective shelter system 10 is not limited to use by warfighters. Civilians, humanitarian missions, first responders or others that may be susceptible to a chemical, biological and/or radiological exposure can employ the chemical protective shelter system 10 presented herein.

From the above discussion it will be appreciated that the chemical protective shelter system that covers and protects a person from chemical exposure presented herein improves upon the state of the art. More specifically, and without limitation, it will be appreciated that various ones of the disclosed embodiments may provide various features or advantages including, for example, a chemical protective shelter system which: covers and protects a person from chemical exposure presented herein: provides protection from chemical agents for persons otherwise unprepared for chemical agent exposure; can be used after injury; allows access for medical staff and equipment without exposing patient; has visual access into and out of the system; provides situational awareness, prevents claustrophobia, has a permeable surface; can easily open and close; has a port for access; can quickly and efficiently seal a person; can adapt to other military issue and clothing; can assist a team in handling a patient; works effectively to filter chemical agents; is durable; is robust; is relatively affordable; is lightweight; is portable; has a long shelf life; lasts for a long time once engaged with a person or persons; is safe; and/or is high quality; among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A chemical protective shelter system, the system comprising:
   a cover assembly;
   the cover assembly having a main panel;
   the cover assembly having a plurality of end panels;
   the cover assembly having a side panel;
   the main panel;
   the main panel having a top;
   the main panel having a bottom;
   the main panel having an exterior surface;
   the main panel having an interior surface;
   the main panel having a zipper;
   wherein at least a portion of the main panel is formed of a filter material having a chemical adsorbent material that filters contaminants from air passing through the filter material;
   the plurality of end panels;
   the plurality of end panels each having a top;
   the plurality of end panels each having a bottom;
   the plurality of end panels each having an exterior surface;
   the plurality of end panels each having an interior surface;
   wherein the plurality of end panels are operably connected to the top of the main panel;
   wherein at least a portion of the plurality of end panels is formed of a filter material having a chemical adsorbent material that filters contaminants from air passing through the filter material;
   the side panel;
   the side panel having a top;
   the side panel having a bottom;
   the side panel having an exterior surface;
   the side panel having an interior surface;
   wherein the side panel is operatively connected to the plurality of end panels;
   wherein at least a portion of the side panel is formed of a filter material having a chemical adsorbent material that filters contaminants from air passing through the filter material;
   a bottom panel;
   the bottom panel having a sidewall;
   the bottom panel having an interior surface;
   the bottom panel having an exterior surface;
   wherein the sidewall of the bottom panel is operably connected adjacent the bottom of the cover assembly;
   wherein the chemical protective shelter system is configured to receive a person or persons such that the cover assembly encloses the person, the cover assembly and the zipper of the cover assembly seals the person within an interior of the chemical protective shelter system, thereby preventing contaminated air from reaching the person inside the shelter;

wherein the filter material of the cover assembly allows air to enter the chemical protective shelter system while filtering contaminants from the air.

2. The system of claim 1, further comprising a powered air purifying respirator operably connected to the chemical protective shelter.

3. The system of claim 1, further comprising a port operably connected to the chemical protective shelter, wherein the port is configured to receive a powered air purifying respirator.

4. The system of claim 1, further comprising a second zipper wherein the second zipper is configured to provide a second opening into the system.

5. The system of claim 1, further comprising an exterior flap wherein the exterior flap is configured to overlap the zipper.

6. The system of claim 1, further comprising an interior flap wherein the interior flip is operably connected to the interior surface of the cover assembly such that the interior flap is configured to overlap the zipper.

7. The system of claim 1, further comprising an interior flap and an exterior flap; wherein the interior flip is operably connected to the interior surface of the cover assembly such that the interior flap is configured to overlap the zipper; wherein the exterior flap is operably connected to the exterior surface of the cover assembly such that the exterior flap is configured to overlap the zipper.

8. The system of claim 1, wherein the cover assembly further comprises a port configured to provide an opening for access to an interior space of the system from an exterior.

9. The system of claim 1, wherein the cover assembly further comprises a window configured to provide a viewable access into and out of the system.

10. The system of claim 1, further comprising a plurality of support rods; wherein the plurality of support rods are configured to stabilize the cover assembly and create an erected system with a hollow interior for housing a plurality of persons.

11. The system of claim 1, wherein the filter material further comprises a layer of durable water resistance; wherein the durable water resistance layer is configured to repel water from the surfaces of the system and prevent water from reaching the chemical adsorbent material.

12. The system of claim 1, wherein the filter material further comprises a HEPA layer; wherein the HEPA layer is configured to filter biological contaminants from the air.

13. The system of claim 1, wherein the filter material further comprises a layer of durable water resistance on the exterior of the chemical adsorbent material and wherein the filter material further comprises a HEPA layer on the interior of the chemical adsorbent material; wherein the durable water resistance layer is configured to repel water from the surfaces of the system and prevent water from reaching the chemical adsorbent material; wherein the HEPA layer is configured to filter biological contaminants from the air.

14. The system of claim 1, further comprising:
an exterior flap; and
a hook and loop fastener; wherein the hook and loop are configured to enclose the zipper within the exterior flap.

15. The system of claim 1, further comprising:
an interior flap; and
a hook and loop fastener; wherein the hook and loop are configured to enclose the zipper within an interior flap.

16. The system of claim 1, further comprising:
an interior flap;
an exterior flap;
a first hook and loop fastener; and
a second hook and loop fastener; wherein the first hook and loop fastener are configured to enclose the zipper within an interior flap; wherein the second hook and loop fastener are configured to enclose the zipper within an exterior flap.

17. The system of claim 1, wherein the chemical protective shelter system is configured and arranged, when erected, to provide a hollow interior capable of sealing a plurality of persons within the hollow interior of the system while permitting the plurality of persons to breathe through the filter material.

18. The system of claim 1, wherein the chemical adsorbent material of the filter material of the cover assembly is formed of a layer of activated carbon particles.

19. The system of claim 1, further comprising a rain cover, wherein the rain cover is configured to operably connect to an exterior surface of the cover assembly.

20. The system of claim 1, further comprising a rain cover, wherein the rain cover is configured to operably connect to the cover assembly; wherein the rain cover includes a filter material including a layer of activated carbon particles.

21. The system of claim 1, wherein the bottom panel is non permeable so as to seal the lower end of the chemical protective shelter system.

22. The system of claim 1, wherein the bottom panel is formed at least partially of a filter material so as to configure the lower portion of the chemical protective shelter to filter air.

23. The system of claim 1, wherein all the material of the cover assembly is a permeable filter material.

24. The system of claim 1, further comprising a webbing, wherein the webbing is operably connected to the cover assembly; wherein the webbing provides a fastener for a support rod to operably connect to the cover assembly, such that the support rod supports the cover assembly.

25. A chemical protective shelter system, comprising:
a cover assembly;
the cover assembly having a main panel;
the cover assembly having a plurality of end panels;
the cover assembly having a side panel;
the main panel;
the main panel having a top;
the main panel having a bottom;
the main panel having an exterior surface;
the main panel having an interior surface;
the main panel having a zipper;
wherein at least a portion of the main panel is formed of a filter material having a chemical adsorbent material that filters contaminants from air passing through the filter material;
the plurality of end panels;
the plurality of end panels each having a top;
the plurality of end panels each having a bottom;
the plurality of end panels each having an exterior surface;
the plurality of end panels each having an interior surface;
wherein the plurality of end panels are operably connected to the top of the main panel;
wherein at least a portion of the plurality of end panels is formed of a filter material having a chemical adsorbent material that filters contaminants from air passing through the filter material;

the side panel;
the side panel having a top;
the side panel having a bottom;
the side panel having an exterior surface;
the side panel having an interior surface;
wherein the side panel is operatively connected to the plurality of end panels;
wherein at least a portion of the side panel is formed of a filter material having a chemical adsorbent material that filters contaminants from air passing through the filter material;
a bottom panel;
the bottom panel having a sidewall;
the bottom panel having an interior surface;
the bottom panel having an exterior surface;
wherein the sidewall of the bottom panel is operably connected adjacent the bottom of the cover assembly;
wherein the chemical protective shelter system is configured to receive a person or plurality or persons such that the cover assembly encloses the person, the cover assembly and the zipper of the cover assembly seals the person within an interior of the chemical protective shelter system, thereby preventing contaminated air from reaching the person contained inside the shelter;
wherein the filter material of the cover assembly allows air to enter the chemical protective shelter system while filtering contaminants from the air;
a powered air purifying respirator;
wherein the powered air purifying respirator is configured to deliver air through a port and into an interior of the chemical protective shelter system.

26. A chemical protective shelter system, comprising:
a cover assembly;
the cover assembly having a plurality of panels;
wherein the plurality of panels are arranged to form a shelter for a person or persons;
wherein the plurality of panels are formed of a filter material having a chemical adsorbent material that filters contaminants from air passing through the filter material;
a bottom panel;
the bottom panel is operably connected to the cover assembly;
wherein the chemical protective shelter system is configured to receive the person or persons such that the cover assembly encloses the person, thereby preventing contaminated air from reaching the person or persons;
wherein the filter material of the cover assembly allows air to enter the chemical protective shelter system while filtering contaminates from the air;
wherein: the plurality of panels includes;
  a main panel, the main panel having a zipper;
  a plurality of end panels;
  a side panel;
wherein the plurality of end panels are operably connected to the main panel;
wherein the side panel is operatively connected to the plurality of end panels;
wherein at least a portion of the cover assembly is formed of a filter material having a chemical adsorbent material that filters contaminants from air passing through the filter material;
wherein the bottom panel includes a sidewall;
wherein the sidewall of the bottom panel is operably connected adjacent the bottom of the cover assembly.

27. The system of claim 26, wherein:
the chemical protective shelter system is configured to receive a person such that the cover assembly encloses the person, the cover assembly and the zipper of the cover assembly seals the person or persons within an interior of the chemical protective shelter system, thereby preventing contaminated air from reaching the person;
wherein the filter material of the cover assembly allows air to enter the chemical protective shelter system while filtering contaminants from the air.

28. A method of protecting a plurality of persons within an interior of a chemical protective shelter system, comprising:
providing a chemical protective shelter system having a cover assembly formed of a laminate of a chemical adsorbent material and a second material;
placing a plurality of persons within the interior of the chemical protective shelter system;
enclosing an opening of the chemical protective shelter system;
filtering contaminants from air that enters the chemical protective shelter system through the material of the cover assembly;
providing a powered air purifying respirator connected to the chemical protective shelter system; and
activating the powered air purifying respirator wherein the powered air purifying respirator is configured to deliver clean air to the interior of the chemical protective shelter system.

29. The method of claim 28, wherein the cover assembly is configured to form a main housing having a hollow interior that shelters the plurality of persons.

30. A chemical protective shelter system, comprising
a cover assembly;
the cover assembly forming an exterior of the chemical protective shelter system;
wherein the cover assembly is formed of a laminate of a chemical adsorbent material that filters contaminants from air passing through the chemical adsorbent material and a second material;
a bottom panel;
the bottom panel is operably connected to the cover assembly;
an opening;
a powered air purifying respirator connected to the chemical protective shelter system;
wherein the powered air purifying respirator is configured to deliver clean air to the interior of the chemical protective shelter system;
wherein the chemical protective shelter system is configured to receive a person or persons such that the cover assembly encloses the person, thereby preventing contaminated air from reaching the person;
wherein the filter material of the cover assembly allows air to enter the chemical protective shelter system while filtering contaminants from the air.

* * * * *

UNITED STATES PATENT AND TRADEMARK OFFICE
CERTIFICATE OF CORRECTION

PATENT NO. : 11,141,612 B2
APPLICATION NO. : 16/824944
DATED : October 12, 2021
INVENTOR(S) : Brian Weber et al.

It is certified that error appears in the above-identified patent and that said Letters Patent is hereby corrected as shown below:

In the Claims

Column 19 Line 64 Claim 15 should read as follows:
15. The system of claim 1, further comprising: an interior flap;
and a hook and loop fastener;
wherein the hook and loop are configured to enclose the zipper within the interior flap.

Column 20 Line 1 Claim 16 should read as follows:
16. The system of claim 1, further comprising: an interior flap;
an exterior flap;
a first hook and loop fastener;
and a second hook and loop fastener;
wherein the first hook and loop fastener are configured to enclose the zipper within the interior flap;
wherein the second hook and loop fastener are configured to enclose the zipper within the exterior flap.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*